UNITED STATES PATENT OFFICE 2,011,255

SODIUM SALT OF 1-PHENYL-2.3-DIMETHYL-PYRAZOLONYL-4-AMINOMETHYLENESULPHOXYLIC ACID AND METHOD OF ITS PREPARATION

Iwan I. Ostromislensky, New York, N. Y., assignor to Medico Chemical Corporation of America, New York, N. Y.

No Drawing. Application July 5, 1934, Serial No. 733,869

4 Claims. (Cl. 260—45)

My invention relates to methods of producing the sodium salt of 1-phenyl-2.3-dimethyl-pyrazolonyl-4-aminomethylenesulphoxylic acid, and to the product itself which has certain valuable medicinal properties.

In accordance with my theory mentioned in my patent application Serial No. 717,723, filed Mar. 28, 1934, every chemical compound which prevents or alleviates the anaphylactic shock in animals, must likewise prevent or alleviate the withdrawal symptoms in morphine addicts, having also specific therapeutic properties for the treatment of the so-called allergic diseases.

While searching for preparations having the above general characteristics, I discovered that the aqueous or alcohol solution of 4-amino-antipyrine, when heated with the sodium salt of formaldehyde sulphoxylic acid, forms a new compound. This compound, in accordance with its chemical properties and the method of its formation, must have the following structure:

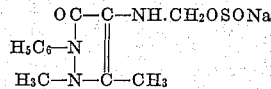

This preparation will be hereinafter for the sake of brevity designated pyrazolonyl sulphoxylate. I have found that the reaction proceeds in accordance with the following equation:

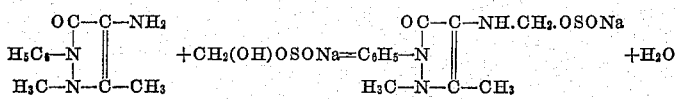

Water may be removed from the solution by evaporation in vacuo, over sulphuric acid, at normal temperature.

Being an analogue of the corresponding sulphonic acid, this compound is distinguished by a relatively low toxicity and by its ability to prevent the anaphylactic shock in sensitized animals. In particular, this substance, when injected subcutaneously into the guinea pigs in the quantity of 0.3 grams per kilogram of their body weight, renders innocuous from 3 to 4 reinjected lethal doses of antigen.

This substance, pyrazolonyl sulphoxylate, represents therefore a valuable therapeutic specific.

In the production of pyrazolonyl sulphoxylate, both the aqueous and the alcohol solutions of the raw materials may be used. At 100° C. the reaction is completed within 10 minutes.

*Example I.*—120 grams of 4-amino-antipyrine hydrochloride are added to 500 cc. of normal solution of sodium hydroxide. The mixture is shaken, and into the resultant solution 77 grams of the sodium salt of formaldehydesulphoxylic acid are introduced. The latter substance, when the liquor is stirred, completely dissolves. The resulting solution is heated on an oil bath to the boiling temperature, at which it is kept for 10 minutes. Then it is evaporated to dryness at normal temperature. The resulting crystalline, almost colorless product contains 29 grams of sodium chloride. For purification it is dissolved in alcohol, and this solution, after filtration, is precipitated by ether.

*Example II.*—189 grams of 4-amino-antipyrine and 154 grams of the sodium salt of formaldehyde sulphoxylic acid containing about 2 molecules of the water of crystallization, are dissolved in one liter of water, and the resulting solution is poured into a flat vessel where it is subjected to evaporation at the room temperature to a constant weight.

*Example III.*—To the solution of pyrazolonyl sulphoxylate in a raw state as obtained in the Example II, is added a mixture of 2 liters of 95% alcohol and 6 liters of ether. The mixture is left standing in a closed vessel for 24 hours. The precipitate which is deposited is sucked off, washed with ether and dried in vacuo over sulphuric acid and paraffin.

Pyrazolonyl sulphoxylate is a substance consisting of large crystals, almost colorless but with a pale yellowish tint. On being heated in a capillary the substance gradually decomposes and chars without melting.

Pyrazolonyl sulphoxylate is easily soluble in cold water (over 25%), but dissolves with difficulty in alcohol. It is not soluble in ether, chloroform, and benzene.

For therapeutic purposes, solutions of pyrazolonyl sulphoxylate may be used freshly prepared from the ingredients of the reaction, i. e., it is not necessary to isolate it in the solid aggregate state. Thus, for instance, an aqueous solution of 1.54 grams of sodium formaldehyde sulphoxylate and 1.89 grams of 4-amino-antipyrine, boiled for 10 minutes, may be directly used for subcutaneous injection or for administration by mouth.

Sodium formaldehyde sulphoxylate may be introduced into the reaction in a quantity considerably exceeding the theory. This substance, being in itself of relatively negligible toxicity, prevents oxidation processes.

I claim as my invention:

1. A method of preparation of the sodium salt of 1-phenyl-2,3-dimethyl-pyrazolonyl-4-aminomethylenesulphoxylic acid, consisting in mixing together solutions of 4-amino-antipyrine and sodium formaldehyde sulphoxylate, and heating the resultant mixture.

2. A method of preparation of the sodium salt of 1-phenyl-2,3-dimethyl-pyrazolonyl-4-aminomethylenesulphoxylic acid, consisting in mixing together solutions of 4-amino-antipyrine and sodium formaldehyde sulphoxylate, the solvents being taken from a group consisting of water and alcohol, and heating the resultant mixture.

3. A method of preparation of the sodium salt of 1-phenyl-2,3-dimethyl-pyrazolonyl-4-aminomethylenesulphoxylic acid, consisting in treating a solution of 4-amino-antipyrine with the solution of sodium formaldehyde sulphoxylate, the solvents being taken from a group consisting of water and alcohol.

4. A sodium salt of 1-phenyl-2,3-dimethyl-pyrazolonyl-4-aminomethylenesulphoxylic acid.

IWAN I. OSTROMISLENSKY.